United States Patent
Venkatapathy (10) Patent No.: US 7,484,205 B2
(45) Date of Patent: Jan. 27, 2009

(54) PREPROCESSOR-BASED SOURCE CODE INSTRUMENTATION

(75) Inventor: Ramanathan Venkatapathy, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 355 days.

(21) Appl. No.: 10/319,776

(22) Filed: Dec. 12, 2002

(65) Prior Publication Data

US 2004/0117771 A1 Jun. 17, 2004

(51) Int. Cl.
*G06F 9/45* (2006.01)

(52) U.S. Cl. .................................................. 717/158

(58) Field of Classification Search ......... 717/106–114, 717/124–127, 130–131, 118–119, 158; 714/38; 702/182; 719/321, 328; 707/1, 102
See application file for complete search history.

(56) References Cited

U.S. PATENT DOCUMENTS

| | | | |
|---|---|---|---|
| 5,175,856 A | | 12/1992 | Van Dyke et al. |
| 5,193,180 A | | 3/1993 | Hastings |
| 5,450,586 A | * | 9/1995 | Kuzara et al. ............... 717/124 |
| 5,535,329 A | | 7/1996 | Hastings |
| 5,581,695 A | | 12/1996 | Knoke et al. |
| 5,581,696 A | * | 12/1996 | Kolawa et al. ................ 714/38 |
| 5,752,034 A | * | 5/1998 | Srivastava et al. ........... 717/130 |
| 6,085,029 A | * | 7/2000 | Kolawa et al. ................ 714/38 |
| 6,106,571 A | * | 8/2000 | Maxwell ..................... 717/131 |
| 6,149,318 A | * | 11/2000 | Chase et al. ................. 717/131 |
| 6,311,327 B1 | * | 10/2001 | O'Brien et al. ............. 717/114 |
| 6,314,558 B1 | | 11/2001 | Angel et al. |
| 6,470,493 B1 | | 10/2002 | Smith et al. |
| 6,721,941 B1 | * | 4/2004 | Morshed et al. ............. 717/127 |
| 6,760,903 B1 | * | 7/2004 | Morshed et al. ............. 717/130 |
| 6,968,540 B2 | * | 11/2005 | Beck et al. .................. 717/130 |
| 7,120,906 B1 | * | 10/2006 | Stephenson et al. ......... 717/158 |
| 2003/0145309 A1 | * | 7/2003 | Inamdar ..................... 717/118 |

OTHER PUBLICATIONS

Badros et al., "A Framework for Preprocessor-Aware C Source Code Analyses", Technical Report UW-CSE-98-08-04, Nov. 14, 1998, pp. 1-17.*
Hunt, G., & Brubacher, D., "Detours: Binary Interception of Win32 Functions" Proceedings of the 3rd USENIX windows NT Symposium, Seattle, jWA, Jul. 1999, pp. 1-9.*
Rational® Purify® for Windows, http://www.rational.com/products/purify_nt/index.jsp, viewed Nov. 13, 2002.
BoundsChecker, http://www.compuware.com/products/devpartner/bounds/, viewed Nov. 13, 2002.

* cited by examiner

*Primary Examiner*—Tuan Anh Vu
(74) *Attorney, Agent, or Firm*—Klarquist Sparkman, LLP (57) ABSTRACT

A preprocessor-based instrumentation technique wherein source code is provided to a compiler that exposes data structures such as symbols, types, expressions, etc. during the construction of the syntax tree in order to analyze where possible defects might make it desirable to instrument the code. Once a possible defect is detected in a segment of code, information is stored in a PI file detailing what line or lines of code to add, remove, or alter so that the code is instrumented to monitor the code segments at runtime. The PI file and source code are then provided to a preprocessor that uses the information in the PI file to insert instrumentation into the source code prior to the construction of a syntax tree. The now instrumented source code is used to build an instrumented syntax tree, which is then compiled so as to produce executable object code.

17 Claims, 8 Drawing Sheets

PREPROCESSOR-BASED SOURCE CODE INSTRUMENTATION

TECHNICAL FIELD

The following invention relates to defect analysis in software, and more particularly, to using preprocessor-based source code instrumentation in order to detect defects in software.

BACKGROUND

When developing software, it is often advantageous for purposes of defect analysis or optimization to instrument the software. Instrumentation of software refers to inserting additional instructions into the software so that when the software is executed, information regarding the software is recorded for subsequent review by the developer. The information varies widely based upon the purpose for instrumenting the software, but can include whether variables were initialized properly, what values they were assigned, how many times a code segment was used, recognizable patterns of code segment usage, memory usage, data access, etc.

When instrumenting software, a developer must choose a point within the compilation process to analyze the software, and also a point within the compilation process to insert the additional instructions. For example, U.S. Pat. No. 5,535,329 to Hastings discloses a method of instrumenting software after object code has been created by the compiler. Executable object code is analyzed for instrumentation points and additional instructions and data designed to instrument the software are inserted in between pre-existing instructions and data. Once the instrumentation instructions are inserted, an offset check is performed such that offsets that may be incorrect due to the new locations of the pre-existing code are corrected to insure proper execution of the software.

U.S. Pat. No. 6,314,558 to Angel at al. discloses a method of instrumenting software during the intermediate representation (IR) stage of compilation. Once source code has undergone lexical and syntax analysis, the resulting parse tree is transformed into an intermediate representation. The intermediate representation of the code is used to construct an IR tree using tree construction software. This IR tree is analyzed in order to determine instrumentation points. Instrumentation data in IR format is then injected into the IR tree to form an instrumented IR tree. The instrumented IR tree is then deconstructed to form an instrumented IR element, which is then compiled to form instrumented object code.

Methods such as those described in Hastings and Angel et al. suffer from a number of defects. First, analysis of intermediate representation or object code is less accurate in detecting possible defects, and in determining how to properly instrument code segments containing defects, because much of the context of the original source code has been lost in the transformation from source code to the intermediate representation, and even more context is lost from the intermediate representation to object code. Second, segments of source code that could be instrumented with only a few instrumentation instructions often translate into many times more instructions and memory accesses at the intermediate representation or object code level, causing additional or unneeded instrumentation instructions to be added. Lastly, during the transformation from the parse tree to the intermediate representation, modifications are made by the compiler based on control flow analysis and for purposes such as handling exceptions and destructors. Therefore, it is advantageous to analyze the code for instrumentation points prior to these modifications.

SUMMARY

The preprocessor-based instrumentation technique described herein provides a method for instrumenting software that overcomes the shortcomings of prior methods. Source code is provided to a compiler that exposes data structures such as symbols, types, expressions, etc. during the construction of the syntax tree in order to analyze where it would be desirable to instrument the code. Information from this analysis is stored in a "PI file." The PI file and source code are then provided to a preprocessor that uses the information in the PI file to insert instrumentation into the source code prior to the construction of a syntax tree. Therefore, the code is analyzed prior to any "lowering" of the code during the compilation process and instrumented at the source code level during preprocessing.

The preprocessor-based instrumentation technique described herein provides a method of analyzing code at the syntax tree level. Any number of methods of analysis can be used such as data flow analysis, pointer analysis, cross-function analysis, etc. in order to decide whether certain types of defects may be present. The criteria used to detect segments of code to be instrumented depends on the type of defect sought. These defects may be memory access violations, uninitialized variable usage, null dereferences, incorrect API usage, memory leaks, etc. Once a possible defect is detected in a segment of code, information is stored in a PI file detailing what line or lines of code to add, remove, or alter so that the code is instrumented to monitor the code segments at runtime.

The preprocessor-based instrumentation technique described herein also provides a method of instrumenting code using a preprocessor to implement changes in the source code during compilation. The preprocessor takes as input the source code and a PI file. The PI file contains directives indicating which segments of code were identified as possible causes of runtime defects, and how they should be instrumented. Based on this information, the preprocessor adds, deletes, or modifies the source code in order to complete the instrumentation. The now instrumented source code is used to build an instrumented syntax tree, which is then compiled so as to produce executable object code.

These and other aspects will become apparent from the following detailed description, which makes references to the accompanying drawings.

DETAILED DESCRIPTION

The preprocessor-based instrumentation technique described herein encompasses methods, systems, and software development tools or utilities that perform improved instrumentation of software. The technique can be broken down into two stages: an instrumentation analysis stage and an instrumentation injection stage. The instrumentation analysis stage determines which segments of code should be instrumented to detect runtime errors, and what changes should be made to those segments of code in order to instrument them. The instrumentation injection stage takes the information from the instrumentation analysis stage and instruments the code accordingly.

Instrumentation of software generally pertains to identifying a property the developer wants to examine or monitor during execution and defining program instructions that will record information at runtime necessary to examine or monitor the property. Locations are then identified in the software where the program instructions can be inserted and the software is modified by adding the instructions in the appropriate locations. The benefit of the process is that subsequent execution of the software will record information necessary to examine or monitor the desired property.

Figure 1:
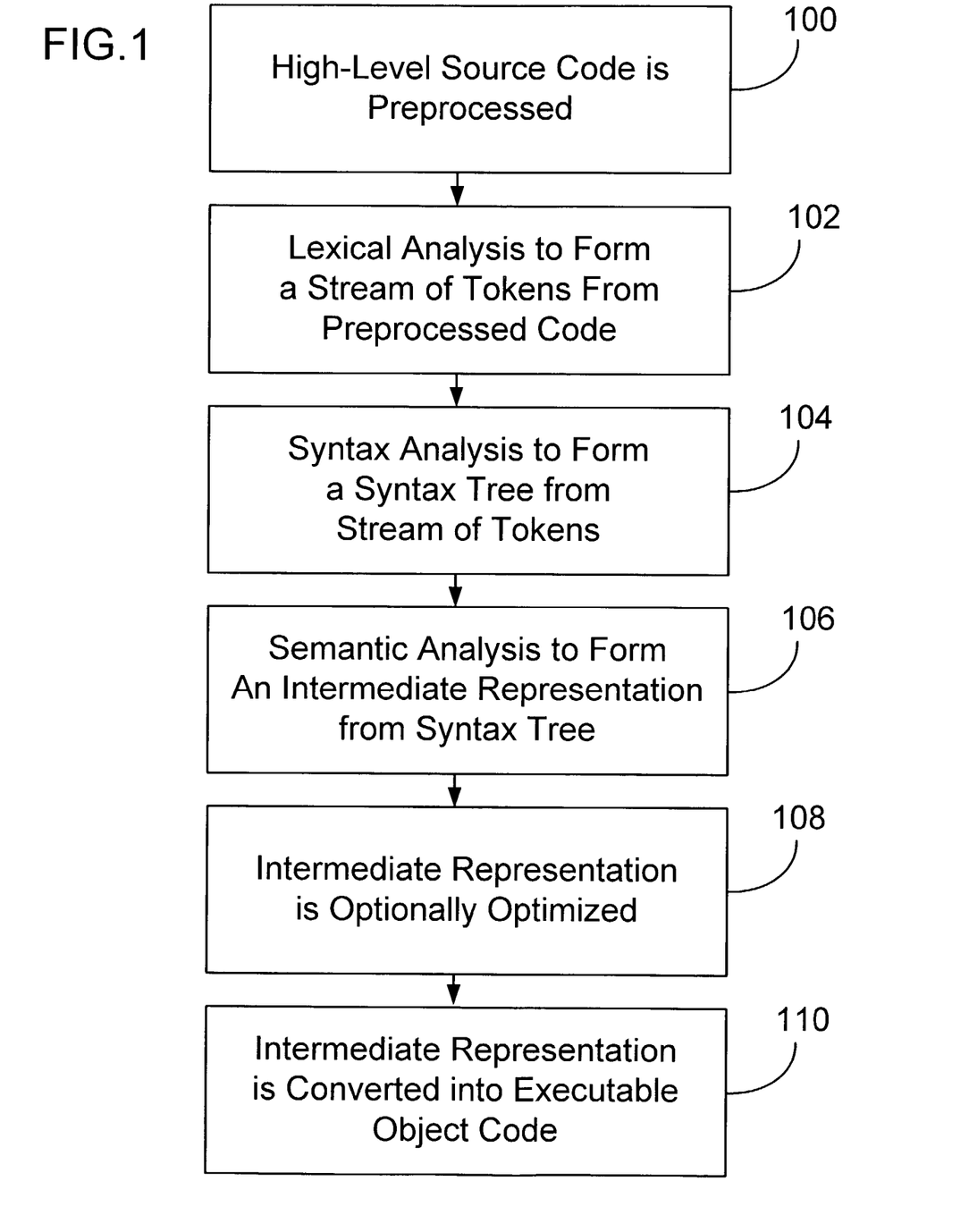
FIG. 1 is a flowchart of a generic compilation process.

A brief overview of the compilation process is beneficial to understanding the various methods of the invention. FIG. 1 is a flow chart of a generic compilation process. The compilation process begins with source code written by the programmer in a high-level programming language (e.g. C/C++, Pascal, Fortran, etc.). The source code is provided to a preprocessor in act 100 where usually a symbol within the high-level programming language directs the preprocessor to include files, perform conditional compilation, or perform macro expansion. The resulting code then undergoes lexical analysis in act 102 to parse code into a stream of tokens. Syntax analysis is then performed in act 104 by the compiler so as to assemble a syntax tree based on the overall structure and flow of the program. Next, the syntax tree is semantically analyzed in act 106 to produce an intermediate representation. The intermediate representation is a lowered language wherein much of the context of the source code has been lost but allows the software to be more easily optimized. If optimization is desired, the intermediate representation will be optimized in act 108, and finally compiled into executable object code in act 110.

Instrumentation Analysis Stage

Figure 2:
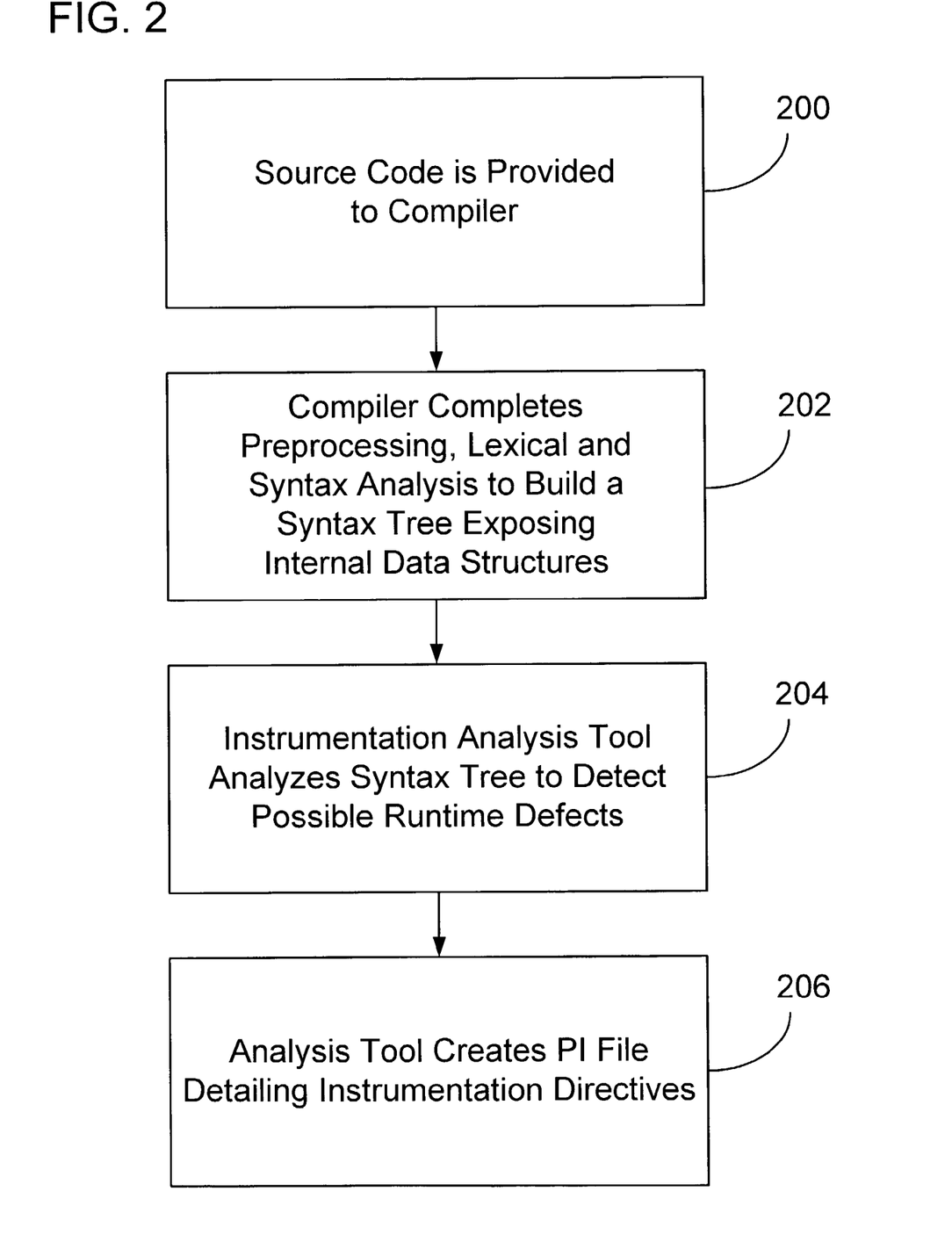
FIG. 2 is a flowchart illustrating one embodiment of an instrumentation analysis stage.

The instrumentation analysis stage is responsible for determining which segments of the code to instrument and what changes should be made to those segments in order to instrument the code properly. FIG. 2 is a flowchart illustrating one embodiment of the instrumentation analysis stage. Source code is provided to a compiler that has been modified to expose internal data structures such as types, expressions, symbols, etc in act 200. A preprocessor within the compiler performs any tasks specified by the source code in act 202. Act 202 also includes lexically analyzing the source code to break it down into a token stream, and syntactically analyzing the token stream to construct a syntax tree. At act 204, an instrumentation analysis tool examines the syntax tree to determine what segments of code possibly contain errors that could cause runtime defects once the code is executed. Once a segment of code has been identified as a possible cause of defects at runtime, the instrumentation analysis tool determines what modifications should be made to properly instrument the code segment and records them in a PI file in act 206. The modifications are implemented so that useful information regarding the section of code will exposed to the developer upon execution of the software.

Figure 3:
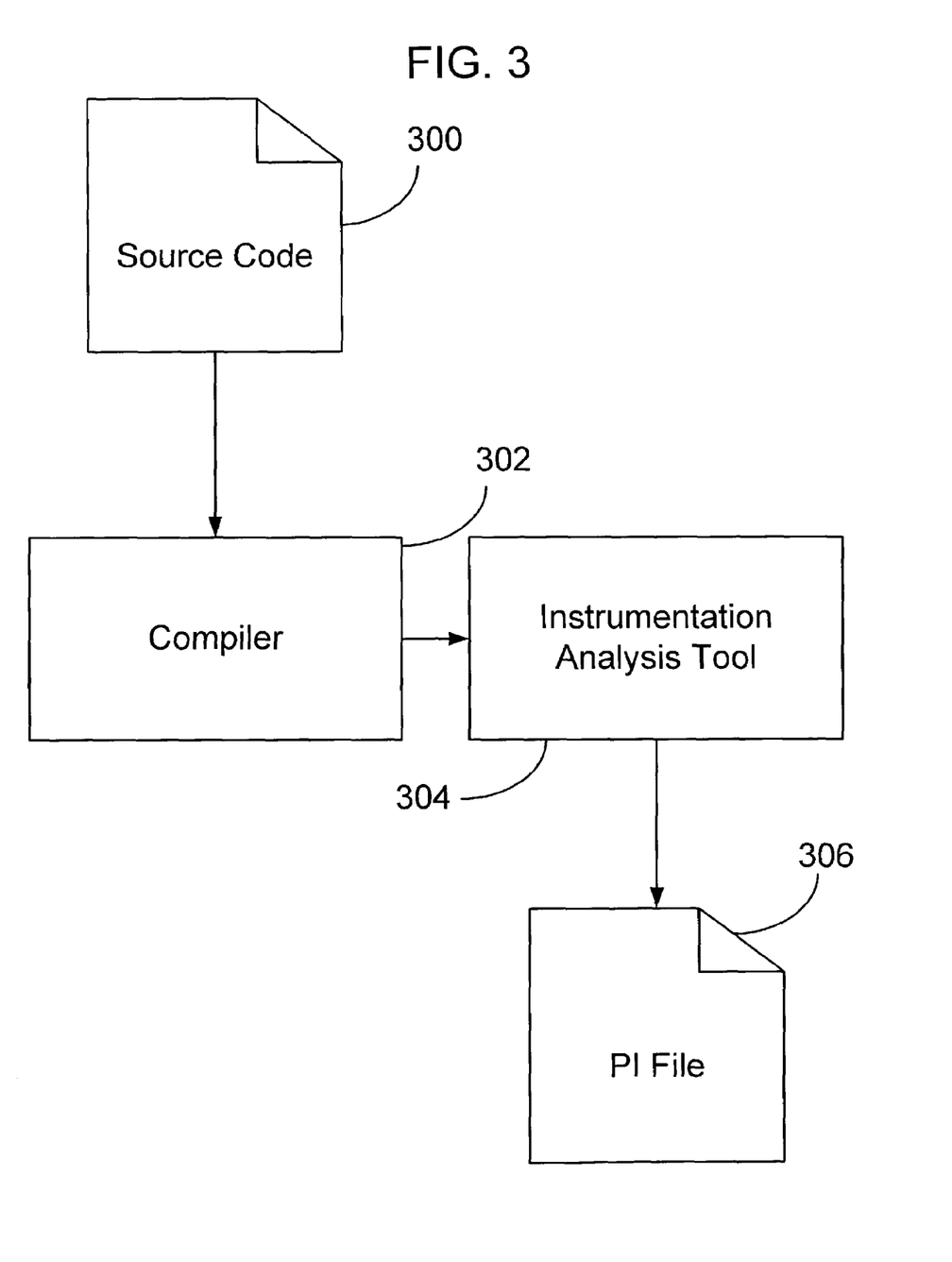
FIG. 3 shows a diagram of one embodiment of a system for implementing the instrumentation analysis stage.

FIG. 3 shows one embodiment of a system for implementing the instrumentation analysis stage. Source code 300 is provided to a compiler 302. The compiler 302 has been modified to expose internal data structures so that once a syntax tree has been assembled for the source code 300, a instrumentation analysis tool 304 can analyze the syntax tree to determine which code segments are likely to produce runtime defects. Once the instrumentation analysis tool 304 determines which segments of code should be instrumented, it also determines what code modifications should be made to properly instrument the code segment. This information is stored in a PI file 306 to be referenced by the instrumentation injection stage.

The examination method used by the instrumentation analysis tool can be any variety of analysis, but is specific to the type of defects sought to be detected. Some possibilities include data flow analysis, pointer analysis, cross-function analysis, or any other method of analysis likely to reveal defects that may be present. The criteria used to detect if a segment of code is instrumented also depends on the type of defect sought. These defects may include but are not limited to memory access violations, uninitialized variable usage, null dereferences, incorrect API usage, memory leaks, etc.

Figure 4:
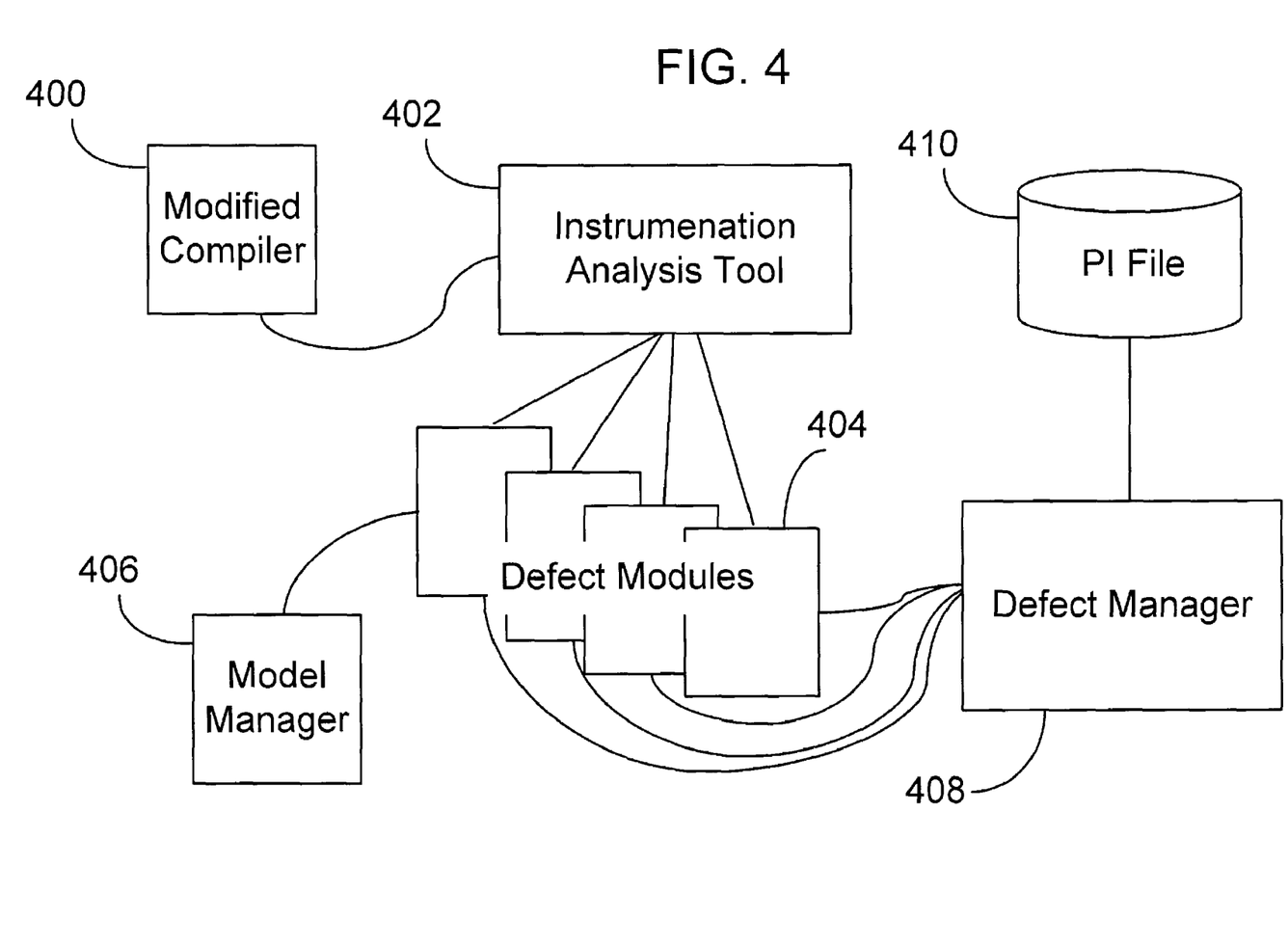
FIG. 4 shows a diagram of another embodiment of a system implementing an instrumentation analysis stage.

FIG. 4 shows another embodiment of a system for implementing the instrumentation analysis stage. In this embodiment, the modified compiler 400 exposes the source code to the instrumentation analysis tool 402 by providing parsed code as objects to the instrumentation analysis tool. For instance, the parsed code could be provided in accordance with the Microsoft Component Object Model ("COM"), as described in "*Inside OLE, Second Edition*," by Kraig Brockschmidt published in Microsoft Press, Redmond, Wash. (1995) for example. The instrumentation analysis tool 402 invokes a series of defect modules 404. Each defect module may register for "events" that correspond to a specific type of defect the module is responsible for detecting in source code. Thereafter, the defect module may be invoked only for declarations, functions, etc. that may contain such a defect. The defect modules 404 also can interact with a model manager 406 containing abstractions of certain function behaviors, such as function behaviors of various application program interfaces, in order to improve the intraprocedural analysis of the defect modules 404. Both defect modules 404 and function models can be defined by a specific user for customized defect detection. The defect modules 404 report to a defect manager 408 which code segments may cause runtime defects and how to instrument them. The defect manager 408 is responsible for producing a PI file 410 detailing the information conveyed by the defect modules 404. The PI file 410 in this embodiment is implemented in Extensible Mark-up Language (XML), but those skilled in the art will recognize other formats can also be used.

The following examples show possible defects detected by a instrumentation analysis tool and the modifications recorded in a PI file to instrument a segment of code containing a possible defect.

An Uninitialized Variable Usage:

The following segment of code contains a possible error at runtime due to an uninitialized variable usage. Specifically, if foo(TRUE) is called, the address of 'i' is passed to 'bar' and may or may not be initialized. This could result in returning an uninitialized variable value. If foo(FALSE) is called, it can statically be seen that a valid value is returned by 'foo'.

```
void bar(int *p);
int foo(bool b)
{
int i;
if (b)
    bar(&i);
else
    i=1;
return i;
}
```

The instrumentation analysis tool determines that 'i' may or may not be initialized if foo(TRUE) is called. Therefore, it can add a shadow variable, 'i_shadow', that tracks the value of variable 'i' and checks if it is valid before it is used. The instrumentation can be noted in the PI file as:

Add("int i_shadow=i", file.cpp(line 5, offset 0));

Add("if (i==i_shadow) reportError( );", file.cpp(line 9, offset 0));

The directives indicate that the phrase "int i_shadow=i" should be added to the file named 'file.cpp' at line 5, offset 0. Likewise, the phrase "if (i==i_shadow) reportError( );" should be added to the file named 'file.cpp' at line 9, offset 0.

A Null Dereference

The following segment of code contains a possible defect at runtime due to a null dereference. A dereference is an attempt to access what a particular pointer is referring to. In the function 'bar', 'ptr' is set to null and then passed to the function 'foo', which may or may not return 'ptr' set to a valid pointer. Therefore, the dereference in the line "printf("character is %c\n", *ptr);" may cause a defect at runtime if 'ptr' is set to null.

```
void foo(char **ptr);
void bar( )
{
char *ptr = NULL;
foo(&ptr);
printf("character is %c\n", *ptr);
}
```

The instrumentation analysis tool determines that 'ptr' may or may not be set to null after 'foo' is called. Therefore, it can track the value of 'ptr' by adding the following directive to the PI file:

Add("if (ptr==NULL) ReportDefect( );", file.cpp(line 6, offset 0))

The directive indicates that the phrase "if (ptr==NULL) ReportDefect( );" should be added to the file named 'file.cpp' at line 6, offset 0.

Incorrect API Usage

For purposes of example, assume that the function 'foo' in the following code segment is an application program interface (API) that expects the variable 'flag' to have a value of five or greater. If the input to 'scanf' was an integer less than five, an unexpected value will be passed to the API 'foo', possibly causing runtime defects.

```
void foo(int flag);
void bar( )
{
int flag;
scanf("%d", &flag);
foo(flag);
}
```

Therefore, the instrumentation tool adds the following directive to the PI file so that it can detect if the value of 'flag' is less than five:

Add("if (flag <5) ReportDefect( );", file.cpp(line 6, offset 0))

The directive adds the line "if (flag <5) ReportDefect( );" to be added to line 6, offset 0 of the file 'file.cpp'.

Memory Leaks

In the following segment of code, the author has requested memory be allocated to the pointer 'ptr' using the malloc command. If memory allocated in this fashion is not subsequently released using the free command, the memory cannot be used by the program for other tasks and therefore loses a portion of the total amount of memory available to the program. This is referred to as a memory leak. Note that if the two predicates based on 'foo1' and 'foo2' both fail, the memory allocated to 'ptr' may not be reclaimed and therefore leaked.

```
bool foo1( );
bool foo2( );
void foo3(char*);
void bar( )
{
char *ptr = (char *)malloc(10);
if (foo1( ))
{
foo3(ptr);
free(ptr);
}
else if (foo2( ))
{
foo3(ptr);
free(ptr);
}
}
```

Therefore, the instrumentation tool adds the following directives to the PI file to ensure the allocated memory has been reclaimed.

Add("bool bReleasedPtr=false;", file.cpp(line 7, offset 0))

Add("bReleasedPtr=true;", file.cpp(line 10, offset 0))

Add("bReleasedPtr=true;", file.cpp(line 15, offset 0))

Add("if (!bReleasedPtr) ReportDefect( );", file.cpp(line 17, offset 0))

The first directive sets a Boolean variable 'bReleasedPtr' to false. The next two directives are placed such that if the memory is reclaimed, the variable 'bReleasedPtr' is set to true. The last directive checks for a true value in the variable 'bReleasedPtr', indicating the memory has been reclaimed.

Instrumentation Injection Stage

Figure 5:
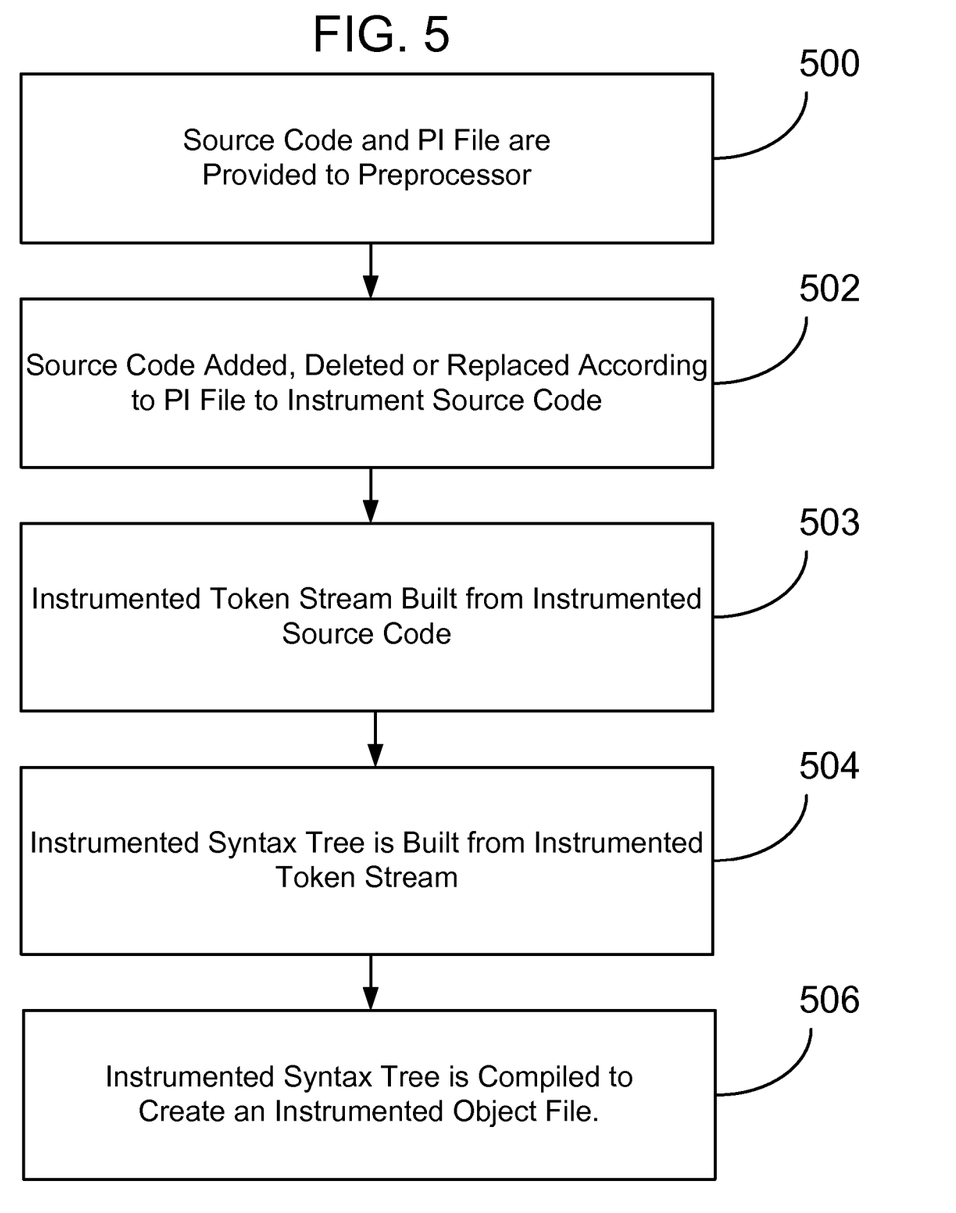
FIG. 5 is a flow chart illustrating an embodiment of the instrumentation injection stage.

The instrumentation injection stage is responsible for making the modifications directed by the PI file and producing an instrumented executable. FIG. 5 is a flow chart illustrating an embodiment of the instrumentation injection stage. Source code and the PI file produced during the instrumentation analysis stage are provided to a preprocessor in act 500. The preprocessor adds, removes, or modifies source code according to the directives in the PI file to instrument the source code in act 502. The instrumented source code is then lexically analyzed to create a token stream from the instrumented source code act 503 this token stream is in turn syntactically analyzed to construct an instrumented syntax tree in act 504. The instrumented syntax tree can be converted into an intermediate representation and optimized at this point, and then converted into executable object code. Alternatively, the instrumented syntax tree can be directly converted into executable object code as shown in act 506.

Figure 6:
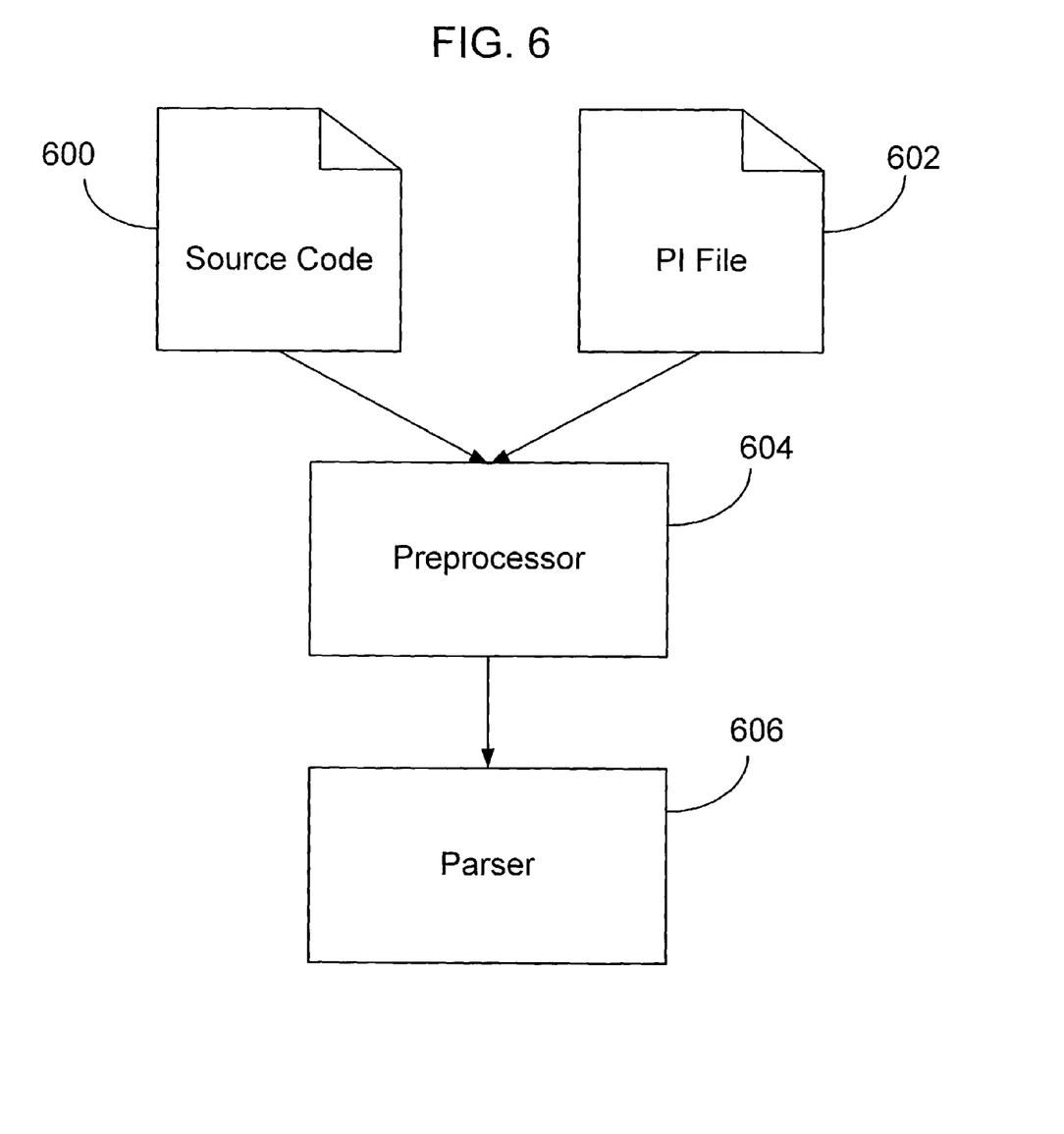
FIG. 6 is a diagram of an embodiment of a system of an instrumentation injection stage.

An example of a preprocessor 604 used in the instrumentation injection stage is shown in FIG. 6. The preprocessor 604 is provided with source code 600 and PI file 602. The preprocessor will read the directives from the PI file and add, delete, or modify the source code 600 per the directives and then provide the instrumented source code to a parser 606. For example, referring to back to the examples from the instrumentation analysis stage, the modifications and resulting code produced by the preprocessor are shown below.

Uninitialized Variable

The following directives were added to the PI file during the instrumentation analysis stage:
   Add("int i_shadow=i", file.cpp(line 5, offset 0));
   Add("if (i==i_shadow) reportError( );", file.cpp(line 9, offset 0));

The preprocessor therefore adds the lines of code indicated to lines 5 and 9 at offset 0 of file.cpp. The original code and instrumented code are set out below.

| Original Code | Line # | Instrumented Code |
|---|---|---|
| void bar(int *p); | Line 1 | Void bar(int *p); |
| int foo (bool b) | . | int foo (bool b) |
| { | . | { |
| int i; | . | int i; |
| if (b) | Line 5 | int i_shadow=i; |
|    bar(&i); | . | if (b) |
| else | . |    bar(&i); |
|    i=1; | . | else |
| return i; | . |    i=1; |
| } | Line 10 | if (i==i_shadow) report error( ); |
| | . | return i; |
| | . | } |

A Null Dereference

The following directive was added to the PI file during the instrumentation analysis stage:
   Add("if (ptr==NULL) ReportDefect( );", file.cpp(line 6, offset 0))

The preprocessor therefore adds the line of code indicated to line 6 at offset 0 of file.cpp. The original code and instrumented code are set out below.

| Original Code | Line # | Instrumented Code |
|---|---|---|
| void foo(char **ptr); | Line 1 | void foo(char **ptr); |
| void bar( ) | . | void bar( ) |
| { | . | { |
| char *ptr = NULL; | . | char *ptr = NULL; |
| foo(&ptr); | Line 5 | foo(&ptr); |
| printf("character is %c\n", *ptr); | . | if (ptr==NULL) reportDefect( ); |

| Original Code | Line # | Instrumented Code |
|---|---|---|
| } | . | printf("character is %c\n", *ptr); |
| | . | } |

Incorrect API Usage

The following directive was added to the PI file during the instrumentation analysis stage:
   Add("if (flag<5) ReportDefect( );", file.cpp(line 6, offset 0))

The preprocessor therefore adds the line of code indicated to line 6 at offset 0 of file.cpp. The original code and instrumented code are set out below.

| Original Code | Line # | Instrumented Code |
|---|---|---|
| void foo(int flag); | Line 1 | void foo(int flag); |
| void bar( ) | . | void bar( ) |
| { | . | { |
| int flag; | . | int flag; |
| scanf("%d", &flag); | Line 5 | scanf("%d", &flag); |
| foo(flag); | . | if (flag<5) reportDefect( ); |
| } | . | foo(flag); |
| | . | } |

Memory Leaks

The following directives were added to the PI file during the instrumentation analysis stage:
   Add("bool bReleasedPtr=false;", file.cpp(line 7, offset 0))
   Add("bReleasedPtr=true;", file.cpp(line 10, offset 0))
   Add("bReleasedPtr=true;", file.cpp(line 15, offset 0))
   Add("if(!bReleaseclPtr) ReportDefect( );", file.cpp(line 17, offset 0))

The preprocessor therefore adds the lines of code indicated to lines 10, 15, and 17 at offset 0 of file.cpp. The original code and instrumented code are set out below.

| Original Code | Line # | Instrumented Code |
|---|---|---|
| bool foo1( ); | Line 1 | bool foo1( ); |
| bool foo2( ); | . | bool foo2( ); |
| void foo3(char*); | . | void foo3(char*); |
| void bar( ) | . | void bar( ) |
| { | Line 5 | { |
| char *ptr = (char *)malloc(10); | . | char *ptr = (char *)malloc(10); |
| if (foo1( )) | . | bool bReleasedPtr = false; |
| { | . | if (foo1( )) |
| foo3(ptr); | . | { |
| free(ptr); | Line 10 |    foo3(ptr); |
| } | . |    bReleasedPtr = true; |
| else if (foo2( )) | . |    free(ptr); |
| { | . | } |
| foo3(ptr); | . | else if (foo2( )) |
| free(ptr); | Line 15 | { |
| } | . |    foo3(ptr); |
| } | . |    bReleasedPtr = true; |
| | . |    free(ptr); |
| | . | } |
| | Line 20 | if (!bReleasedPtr) ReportDefect( ); |
| | . | } |

Figure 7:
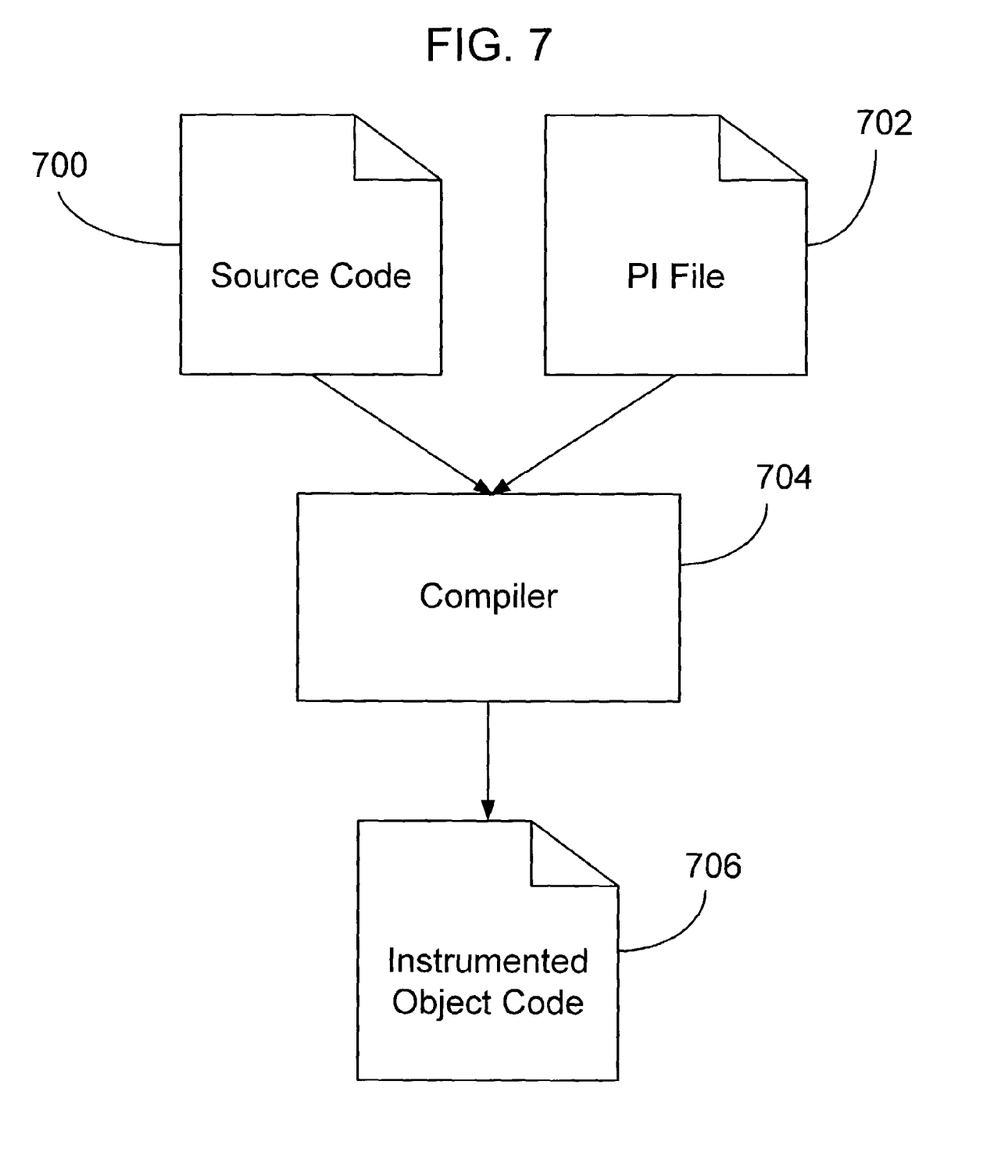
FIG. 7 is a diagram of another embodiment of a system for implementing the instrumentation injection stage.

FIG. 7 shows one embodiment of a system for implementing the instrumentation injection stage. Source code 700 and PI file 702 are provided to a compiler 704. The compiler 704 uses the directives in the PI file 702 to instrument the source code 700. The instrumented source code is then compiled into instrumented object code 706.

Exemplary Operating Environment

Figure 8:
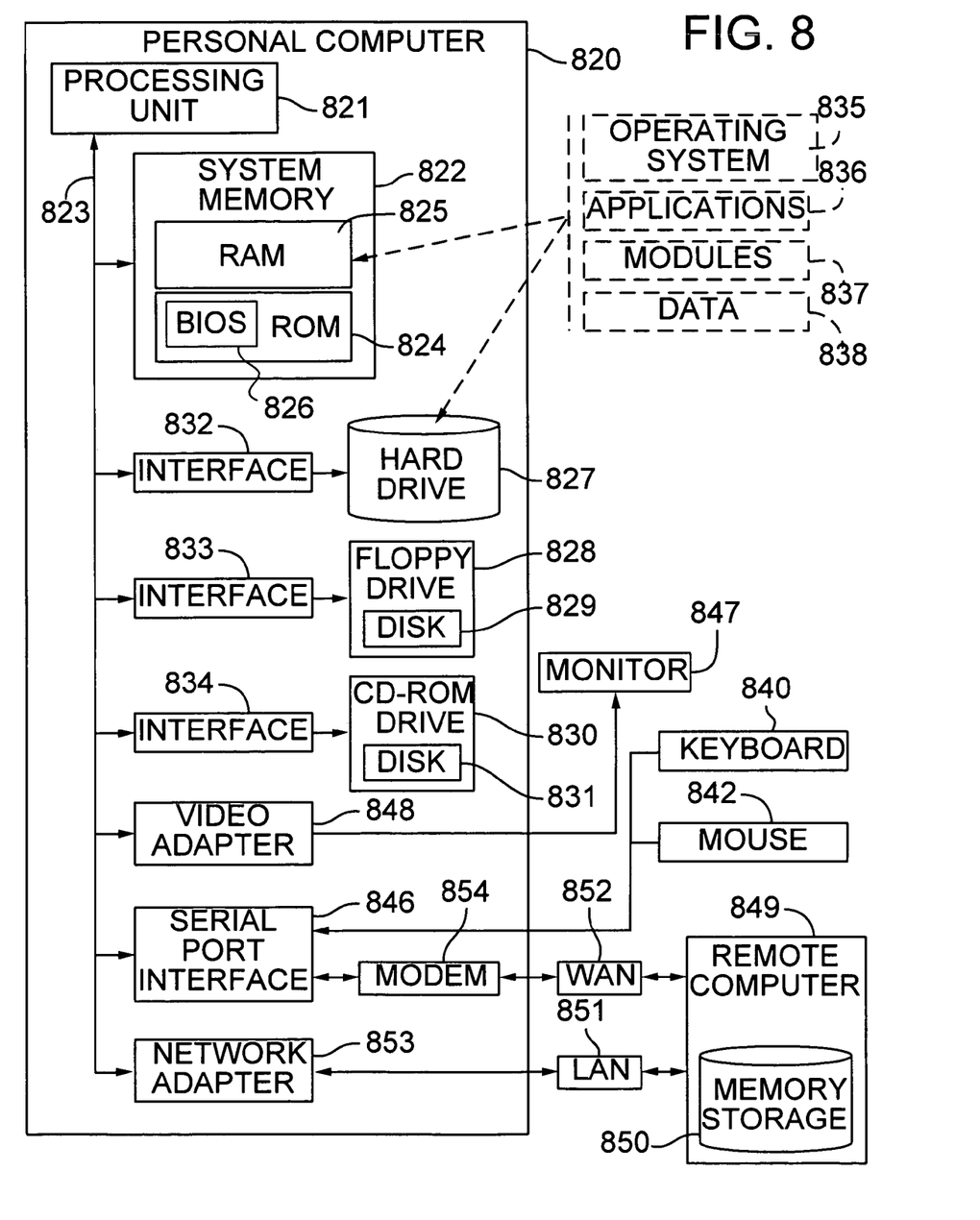
FIG. 8 is a block diagram illustrating an example of a computer system that serves as an operating environment for preprocessor-based instrumentation of software.

FIG. 8 illustrates an example of a computer system that serves as an operating environment for preprocessor-based instrumentation of software. The computer system includes a personal computer 820, including a processing unit 821, a system memory 822, and a system bus 823 that interconnects various system components including the system memory to the processing unit 821. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 824 and random access memory (RAM) 825. A basic input/output system 826 (BIOS), containing the basic routines that help to transfer information between elements within the personal computer 820, such as during start-up, is stored in ROM 824. The personal computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions (program code such as dynamic link libraries, and executable files), etc. for the personal computer 820. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 825, including an operating system 835, one or more application programs 836, other program modules 837, and program data 838. A user may enter commands and information into the personal computer 820 through a keyboard 840 and pointing device, such as a mouse 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a display controller or video adapter 848. In addition to the monitor, personal computers typically include other peripheral output devices (not shown), such as speakers and printers.

The personal computer 820 may operate in a networked environment using logical connections to one or more remote computers, such as a remote computer 849. The remote computer 849 may be a server, a router, a peer device or other common network node, and typically includes many or all of the elements described relative to the personal computer 820, although only a memory storage device 850 has been illustrated in FIG. 8. The logical connections depicted in FIG. 8 include a local area network (LAN) 851 and a wide area network (WAN) 852. Such networking environments are commonplace in offices, enterprise-wide computer networks, intranets and the Internet.

When used in a LAN networking environment, the personal computer 820 is connected to the local network 851 through a network interface or adapter 853. When used in a WAN networking environment, the personal computer 820 typically includes a modem 854 or other means for establishing communications over the wide area network 852, such as the Internet. The modem 854, which may be internal or external, is connected to the system bus 823 via the serial port interface 846. In a networked environment, program modules depicted relative to the personal computer 820, or portions thereof, may be stored in the remote memory storage device. The network connections shown are merely examples and other means of establishing a communications link between the computers may be used.

Having illustrated and described the principles of the illustrated embodiments, it will be apparent to those skilled in the art that the embodiments can be modified in arrangement and detail without departing from such principles.

For example, the embodiment illustrated herein uses a preprocessor to implement the directives stored in the PI file. However, in an alternative embodiment the directives stored in the PI file may be implemented in the source code by a separate apparatus or by another apparatus already present such as the parser. Another embodiment may include an apparatus implementing the directives of the PI file at some other stage of compilation other than during preprocessing, such as during the lexical analysis or syntactic analysis.

In view of the many possible embodiments, it will be recognized that the illustrated embodiments include only examples and should not be taken as limitations on the scope of the invention. Rather, the invention is defined by the following claims. I therefore claim as the invention all such embodiments that come within the scope of those claims.

I claim:

1. A computer-implemented method for instrumenting software, the method comprising:
   receiving a source code file containing source code to be instrumented;
   performing first lexical and syntactic analyses on the source code to build a syntax tree representing the source code;
   using one or more defect modules:
      analyzing the syntax tree representing the source code to identify a location in the source code file of at least one code segment in the source code to instrument to detect one or more types of defects potentially occurring at runtime, the one or more types of defects including runtime errors which potentially occur when executing compiled code based on the at least one code segment; and
      determining, as a result of analyzing the syntax tree, at least one source code modification to perform to the at least one code segment in the source code file to instrument the at least one code segment in the source code according to the one or more types of defects to potentially be detected;
   recording XML directives describing the at least one determined modification in an instrumentation directive file, the directives specifying changes to be made to the source code at one or more lines in the source code file and at one or more offsets within the one or more lines to describe how to instrument the at least one code segment by performing the determined source code modification;

after the directives are recorded in the instrumentation directive file by the defect modules, instrumenting the source code by applying the changes to the source code file at the one or more lines and the one or more offsets as indicated by the directives in the instrumentation directive file to create instrumented source code comprising instrumented versions of the at least one identified code segment;

compiling the instrumented source code to create an instrumented compiled version of the source code.

2. The method of claim 1 wherein the at least one code segment is modified during preprocessing.

3. The method of claim 1 wherein the compiling the source code comprises constructing an instrumented syntax tree from the instrumented source code.

4. The method of claim 1 wherein the changes to be made to the source code comprise add, remove, or replace instructions.

5. The method of claim 4 wherein one of the directives further comprises additional source code.

6. A method comprising:

causing software to be executed upon a computer possessing a processing unit operable to execute the software, the software operable to:

create a syntax tree based on uninstrumented source code in a source code file;

analyze the syntax tree to identify at least one code segment of the uninstrumented source code to instrument in order to detect one or more types of runtime defects which potentially occur during execution of compiled code based on the at least one code segment;

determine, as a result of analyzing the syntax tree, at least one modification to one or more offset locations within one or more specific lines of code in the at least one code segment of the uninstrumented source code to properly instrument the at least one code segment according to the one or more types of runtime defects to potentially be detected;

save, in an instrumentation directive file, at least one XML directive identifying how to instrument the at least one code segment by performing the at least one modification as well as indications of the one or more offset locations and the one or more specific lines of code; and analyze the instrumentation directive file containing the at least one directive; and instrument the source code by modifying the source code based on the at least one directive prior to compiling and executing the source code.

7. The method of claim 6 wherein the at least one code segment is modified during preprocessing.

8. The method of claim 6 wherein the at least one directive comprises additional source code, data identifying a line number and offset location in the source code file, and an instruction to add the additional source code to the source code file at the line number and offset location in the source code file.

9. The method of claim 6 wherein the at least one directive comprises additional source code, data identifying a line number and offset location in the source code file, and an instruction to replace the source code at the line number and offset location in the source code file with the additional source code.

10. The method of claim 6 wherein the at least one directive comprises data identifying a line number and offset location in the source code file, and an instruction to remove the source code at the line number and offset location in the source code file.

11. A computer-implemented system for instrumenting software, the system comprising:

a processing unit for processing computer instructions, and;

storage media connected to the processing unit via a communications bus, the storage media containing computer instructions for:

a parser that exposes source code in a source code file;

an instrumentation analysis tool which:

creates and analyzes a syntax tree based upon the exposed source code;

identifies, as a result as the analysis, at least one code segment of the source code which has potential to cause runtime defects to instrument;

determines as a result of the analysis at least one modification to the at least one code segment of the source code, such that, when the at least one modification is performed on the at least one code segment, the at least one code segment is instrumented, to observe for the type of runtime defects to potentially be detected; and creates an instrumentation directive file containing at least one XML directive identifying how to instrument the at least one code segment by performing the at least one modification at a particular line and offset within the line specified by the at least one directive; and a compiler that instruments the source code based on the instrumentation directive file before compiling the instrumented source code to create instrumented software.

12. The system of claim 11 wherein the instrumentation analysis tool further comprises at least one defect module that determines whether a code segment of the source code could cause runtime defects and how and at what location to instrument the given code segment.

13. The system of claim 12 wherein the instrumentation analysis tool further comprises a defect manager that records data provided by the defect module in the instrumentation directive file.

14. The system of claim 11 wherein the parser exposes the source code by exposing the at least one code segment of the source code as an object.

15. The system of claim 11 wherein the compiler comprises a preprocessor responsible for instrumenting the source code based on the at least one directive contained in the instrumentation directive file.

16. A computer-implemented method for instrumenting software, the method comprising:

using a modified compiler to expose source code in a source code file by parsing the source code;

providing the exposed source code to an instrumentation analysis tool as one or more objects;

building a syntax tree from the provided one or more objects of exposed source code by the analysis tool;

invoking one or more defect modules by the instrumentation analysis tool to analyze the syntax tree to detect defects in the exposed source code that are capable of causing errors at runtime, wherein each defect module is responsible for detecting specific types of defects;

reporting to a defect manager by at least one of the one or more defect modules, as a result of the analysis, of one or more potentially defective segments of the exposed source code and how to instrument each of the one or more potentially defective segments by modifying the source code;

generating by the defect manager an instrumentation directive file containing at least one XML directive for instrumenting the source code wherein the at least one directive is derived from the report of the at least one defect module and identifies each of the one or more potentially defective segments and how to instrument each of the one or more potentially defective segments by modifying the source code at one or more lines and offsets within the one or more lines of the source code file; and instrumenting the source code file by modifying the source code based on the one or more directives contained in the instrumentation directive file at the locations specified in the instrumentation directive file; and compiling the modified source code file to create instrumented software.

17. The method of claim 16 wherein the instrumentation directive file is implemented in Extensible Mark-up Language (XML).

* * * * *